United States Patent [19]

Major

[11] 4,417,388
[45] Nov. 29, 1983

[54] METHOD OF MAKING A MULTIPLE OPEN TURN LAP WOUND DYNAMOELECTRIC MACHINE

[75] Inventor: Jeffrey T. Major, Cygnet, Ohio
[73] Assignee: Allied Corporation, Morristown, N.J.
[21] Appl. No.: 211,483
[22] Filed: Nov. 28, 1980
[51] Int. Cl.$^3$ .............................................. H02K 15/06
[52] U.S. Cl. ....................................... 29/598; 29/606; 310/206; 310/208
[58] Field of Search ................. 29/598, 597, 606, 596; 310/202, 206, 208

[56] References Cited

U.S. PATENT DOCUMENTS

| | | | |
|---|---|---|---|
| 618,727 | 1/1899 | Priest . | |
| 1,329,027 | 1/1920 | Sparrow | 310/206 |
| 1,406,184 | 2/1922 | Haas . | |
| 1,685,752 | 9/1928 | Powell . | |
| 1,849,215 | 3/1932 | Apple . | |
| 1,860,977 | 5/1932 | Apple | 29/598 |
| 2,477,951 | 8/1949 | Baumann . | |
| 2,546,736 | 3/1951 | Fry et al. . | |
| 2,668,926 | 2/1954 | Johnson | 310/265 |
| 2,714,174 | 7/1955 | Applegate | 310/265 |
| 3,239,703 | 3/1966 | Long et al. | 310/183 |
| 3,452,786 | 7/1969 | Lund et al. | 140/92.2 X |
| 3,535,573 | 10/1970 | Appleton et al. | 310/177 |
| 3,705,459 | 12/1972 | Biddison | 29/597 |
| 3,733,506 | 5/1973 | Jaffe et al. | 310/198 |
| 4,131,988 | 1/1979 | Finegold | 29/596 |
| 4,197,475 | 4/1980 | Ban et al. | 310/203 |

OTHER PUBLICATIONS

*Principles of Direct-Current Machines:* Langsdorf; McGraw Hill; 1940.
*Principles of Direct-Current Machines:* Langsdorf; McGraw Hill; 1959.

*Primary Examiner*—Carl E. Hall
*Attorney, Agent, or Firm*—James P. DeClercq

[57] ABSTRACT

Lap wound direct-current dynamoelectric machines may allow excessive currents to flow in single turn windings when such machines are operated at relatively low speeds and/or relatively high voltages, and plural turn windings cannot be practically formed from heavy gauge wire, or from heavy gauge rectangular wire or from rectangular wire, to efficiently fill armature slots. A plural turn, preformed winding is disclosed having two ends for connection to commutator segments substantially adjacent each other on the armature, and with at least four sides defining at least two open turns, for engaging slots in the armature core which are spaced substantially 90° apart for a four pole machine. A three open turn winding is also disclosed. The number of open turns is limited only by space available in the armature coil slots.

2 Claims, 6 Drawing Figures

COMM. ARC 360° – 1 BAR

METHOD OF MAKING A MULTIPLE OPEN TURN LAP WOUND DYNAMOELECTRIC MACHINE

BACKGROUND OF THE INVENTION

This application is related to application Ser. No. 021,454, filed Mar. 19, 1979, entitled "Four Pole Wave Wound Direct Current Machine With Multi-Turn Armature Coils", now U.S. Pat. No. 4,270,065, issued May 26, 1981. The instant application relates to a dynamoelectric machine with an armature wound with lap windings consisting of multiple open turn coils.

For dynamoelectric direct current machines, there is a tendency for excessive current to flow in armature windings having only a single turn. Such dynamoelectric machines are often used in such applications as providing motive power for material handling equipment, using high voltage battery packs, and often used at relatively low speeds. One common method for limiting the current in such armature windings is to form windings with a plurality of turns. An armature of this type for a D.C. motor is illustrated, for example, in U.S. Pat. No. 3,506,864 which is directed to winding an armature with a plurality of turns extending between two spaced slots in a laminated core.

This patent is directed to closed-turn windings, which are practical only with thin flexible wire having a round cross section. Such windings may be made either by winding a thin wire repeatedly through a pair of armature slots in the manner disclosed in U.S. Pat. No. 3,506,864, or by bundling wires together in a loop, binding them together, and subsequently installing the assembled coil in armature slots. Such a coil is disclosed in the treatise by A. S. Langsdorf entitled, "Principles of Direct-Current Machines," fifth edition, published 1940, by McGraw-Hill Book Company, (New York & London), especially pages 325, 327, 344, and 345. Similar information may be found in the sixth edition of this treatise, published in 1959, at page 50. Such windings, being formed with closed windings, are impractical with larger wire, or with wire of a square cross section. As can be seen, such coils are formed of copper wire, in a plane. Armatures have radial slots. The copper wire, having a low yield point can be easily spread to reach the entrances of the radial armature slots. Then, the coil must be compressed, since the bottoms of the armature slots are at a lesser spacing than the tops. The copper wire cannot be distorted far enough to reach its yield point, and thus elastically resists lying properly at the bottom of the armature slots. While it is possible to retain such wires with wedges and the like, this yields a motor with additional pieces, each presenting another possible mode of failure and further difficulties and expense in assembling a motor. If many turns of thin wire are bundled together, this approach may be feasible, since the wires slip with respect to each other, and the friction between wires in the bundled coil retains its position after small movements that do not distort the copper wire to its yield point. However, this technique will not work with square wire, due both to the reduced surface area in contact, and the fact that square wire is wound in one plane, and resists being twisted out of the plane to fit in the radially-extending armature slots.

Heretofore, when the advantages of square conductors were desired, yielding a machine with more efficiency, since the armature slots are completely filled, as distinguished from having perhaps twenty-five percent or more air space, it was necessary to either limit each winding to a single open turn in order to place the conductor in the armature slot, it being pulled tightly towards the bottom of the slot by the connections to the commutator, or to form each winding in several sections which were welded or soldered together to form a continuous conductor. This greatly increases the complexity and cost of manufacturing the armature, and again yields a winding with a plurality of connections, each presenting a possible failure point of such an armature in use.

The prior art has suggested that the number of windings may be increased by doubling the number of windings in each armature core slot, and suggested methods of reducing the number of commutator slots by modifying the windings in various types of machines. However, the prior art has not disclosed a workable structure for implementing multiple open turn lap windings using wire large enough to be self-supporting, and having a large enough cross sectional area to require significant force both to cause the material to reach its yield point when being bent, and to maintain in position when the material is below its yield point.

SUMMARY OF THE INVENTION

According to the present invention, a method is provided for placing a plural turn open-wound lap winding on an armature core, illustrated as an armature core for a four pole lap wound direct current machine. Lap wound machines are advantageously used where it is desirable to reduce circulating armature currents, lap wound machines having a less complex armature path between pairs of brushes than wave wound machines, and the number of armature segments and the number of poles such a machine being even numbers, as opposed to the odd number of segments used in a wave wound machine, the number of poles being an even number. The basic armature is of a conventional design, in that it has a commutator formed from a plurality of commutator segments mounted adjacent one end of a shaft, and a slotted laminated core mounted on a central region of the shaft. According to the present invention, a plurality of lap windings, each having at least two open turns, are mounted in the core slots. Each winding is electrically connected between two commutator segments which are adjacent each other on the commutator. In the case of the illustrated armature, the four sides of each winding which form two open turns are mounted in four slots which are spaced 90° apart about the armature axis. The windings may be formed of a round wire of a sufficiently small gauge as to be deformable, although sufficiently large to be self-supporting, each winding being free formed on a substantially flat surface to define the open turns. This flat, free-formed winding then is wrapped about the armature core with the sides of the turns positioned within their assigned slots, and the two ends connected to substantially adjacent commutator sections. As will be apparent, the commutator segments may not be strictly adjacent, since the invention is also feasible in duplex lap windings, in triplex lap windings, and in multiplex lap windings generally, the degree of multiplicity determining the number of commutator segments between the start commutator segment and the finish commutator segment, such that in a triplex lap winding, there are two commutator segments between the commutator segments connected to the two ends af the multiple open turn lap winding of the invention. With heavier gauge wire, or with wire having a rectangular cross section, the winding is free formed to its final shape, and spread apart to permit positioning the winding over the armature core and inserting each side of the winding into its assigned slot. After the winding is placed in the slots in the armature core, the two ends of the winding are connected to risers for two commutator segments which are spaced substantial adjacent each other. By free forming each winding to substantially its final shape and using open turns as distinguished from closed turns, it is possible to wind armatures with relatively heavy gauge wire having a rectangular cross section and with a plurality of turns for each winding. In the past, it was not possible to wind armatures in this manner.

Accordingly, it is an object of the invention to provide an improved armature and method for winding an armature for a lap wound direct machine.

Another object of the invention is to provide an improved armature and a method for winding an armature for a four pole lap wound direct current machine with a plurality of open turns of heavy gauge rectangular cross section wire for each winding.

Other objects and advantages of the invention will become apparent from the following detailed description, with reference being made to the accompanying drawings.

DESCRIPTION OF THE PREFERRED EMBODIMENT

Figure 1:
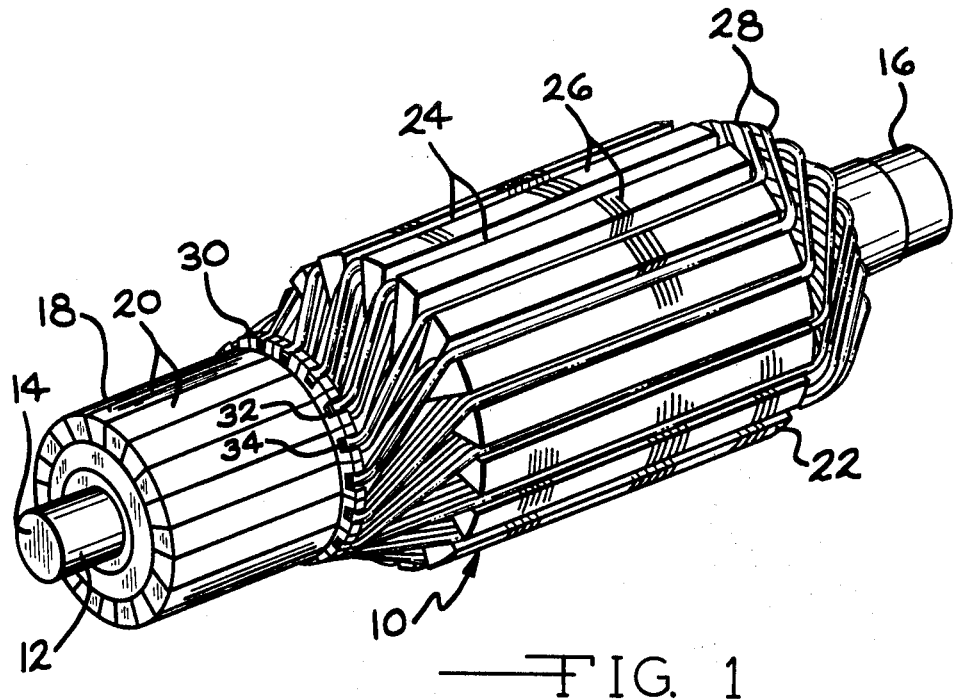
FIG. 1 is a perspective view of an exemplary armature for a four pole lap wound direct current machine constructed in accordance with the present invention.

Referring particularly to FIG. 1, an armature 10 has a shaft 12 which is supported at end 14 and 16 by bearings mounted to a motor housing, not shown. A commutator 18 has a plurality of bars or segments 20 mounted on the shaft 12 with the segments circumferentially spaced about the armature shaft 12 and electrically insulated from each other. A laminated core 22 extends between the commutator 18 and the shaft end 16. The laminated core 22 is formed from a ferromagnetic material and has alternating slots 24 and teeth 26 formed in its outer surface and extending radially in a direction parallel with the axis of the shaft 12. A plurality of multiple open turn lap windings 28 are positioned within the core slots 24. Each winding 28 forms at least two turns, having four sides, which are positioned in four different slots 24, spaced 90° apart about the core 22 of an armature 10 for a four pole lap wound direct current machine. Each winding 28 is formed from a single continuous electrical conductor and has two ends which are connected to two of the commutator segments 20 spaced substantially adjacent each other. A riser 30 is provided at the end of each of the commutator segments 20 adjacent the laminated core 22 for connecting the ends of two windings 28 to each commutator segment 15. Therefore, for the illustrated four pole simplex lap wound armature, each winding will have a first end 32 which is outermost in a commutator riser 30, and a second end 34 which is innermost of two such ends in an adjoining riser 30.

The armature 10 is provided with identical pluralities of commutator segments 20, core slots 24 and windings 28. For a lap wound machine, the number of segments and windings is always even. Since the winding 28 has four sides, they will be positioned in four different slots 24, so that each slot 24 will contain the side or legs of four different ones of the windings 28.

Figure 2:
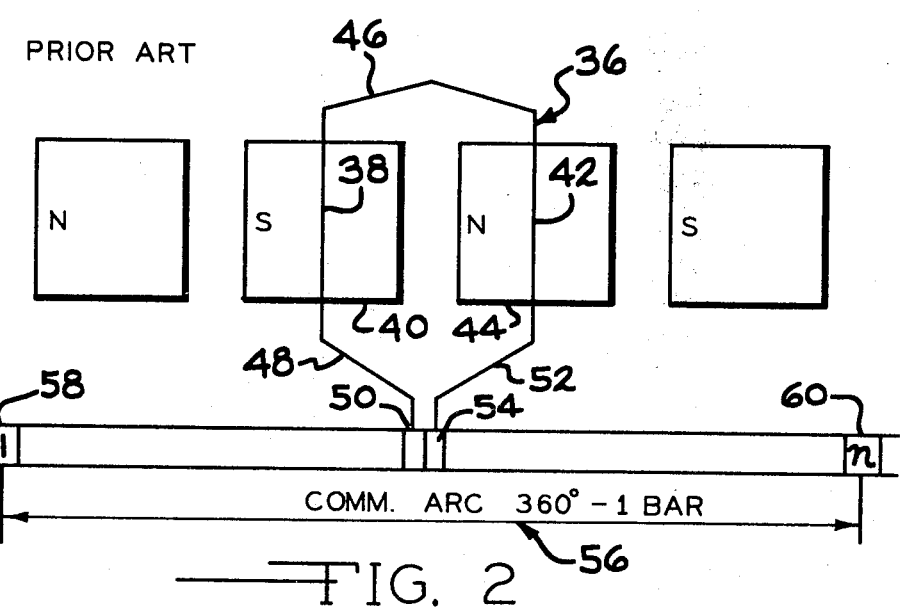
FIG. 2 is a fragmetary diagram illustrating one prior art method for connecting a single turn lap winding between two commutator segments on a four pole direct current machine.
Figure 3:
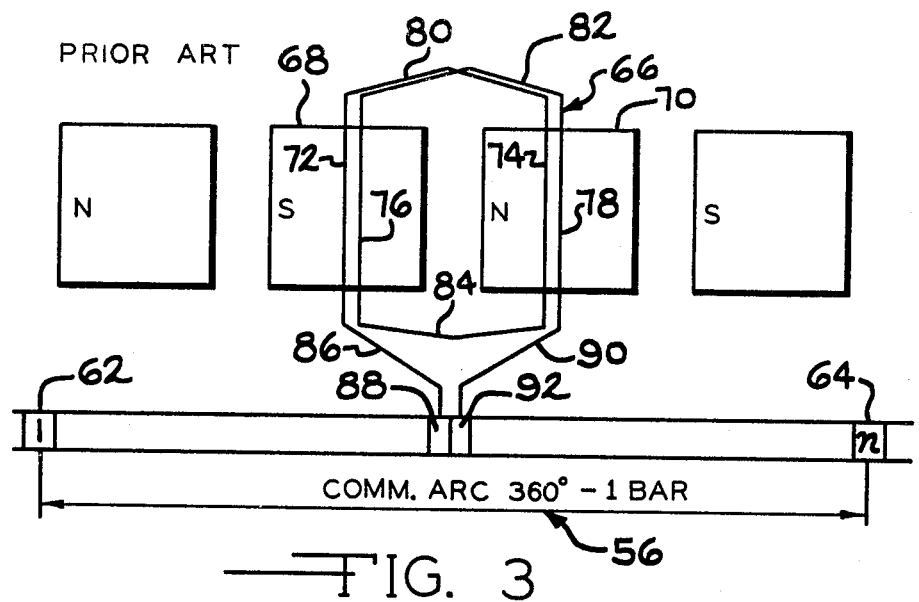
FIG. 3 is a fragmentary diagram illustrating a prior art method for doubling the number of turns on a lap wound armature for a four pole direct current machine.

FIGS. 2 and 3 illustrate prior art for winding the armature of a four pole direct current machine. FIG. 2 is a pictorial illustration of a single turn conventional lap winding 36. The winding 36 has a side 38 which is shown positioned adjacent a south pole 40 and a side 42 which is shown positioned adjacent a north pole 44. A knuckle 46 interconnects one end of the two sides 38 and 42. The other end of the side 38 is connected through a leg 48 to a commutator segment 50, and the other end of the side 42 is connected through a leg 52 to a commutator segment 54. As illustrated, the commutator segments 50 and 54 are adjacent each other, although, conventionally, in a multiplex form of winding, there may be segments interposed between segments 50 and 54. Nevertheless, segments 50 and 54 will remain substantially adjacent each other considering the total number of commutator segments. As illustrated, there are n commutator segments in 360 mechanical degrees less one bar of commutator arc 56, from segment 58 to segment 60. This conventional lap winding is normally satisfactory, for such motors or generators. However, excessive currents can occur with this winding arrangement in, for example, D.C. rotary transformers for control in the voltage available to a traction motor in a battery powered vehicle, which may be operated at relatively high voltages and low speeds.

FIG. 3 illustrates a method for increasing the number of winding turns on the armature for a four pole lap wound direct current machine. In this arrangement, the number of turns are doubled without increasing the number of commutator segments, there being as many segments from segments 62 to 64 as from segments 58 to 60, as shown in FIG. 2, over the commutator mechanical arc 56 of 360° less one bar. Each winding is in the form of a two turn closed loop. A single winding 66 of the plurality of armature windings is illustrated positioned adjacent a south pole 68 and a north pole 70. The winding 66 has four sides, 72, 74, 76 and 78. The sides 72 and 76 are positioned adjacent the south pole 68, and the sides 74 and 78 are positioned adjacent the north pole 70. Ends of the sides 72 and 74 are interconnected by a knuckle 80, ends of the sides 76 and 78 are connected by a knuckle 82, and ends of side 76 and 74 are connected by a knuckle 84. The remaining end of side 72 is connected through a leg 86 to a commutator segment 88, and the remaining end of side 78 is connected by a leg 90 to a commutator segment 92 substantially adjacent commutator segment 88.

By doubling the number of turns of the winding 66 over the winding 36 shown in FIG. 2, the applied voltage, or the generated voltage, may be doubled. However, the winding 66 is in the form of a closed loop which is difficult to insert into armature cores when made from heavy gauge conductors, and is difficult to form and use with rectangular wire, for the reasons stated above.

Figure 4:
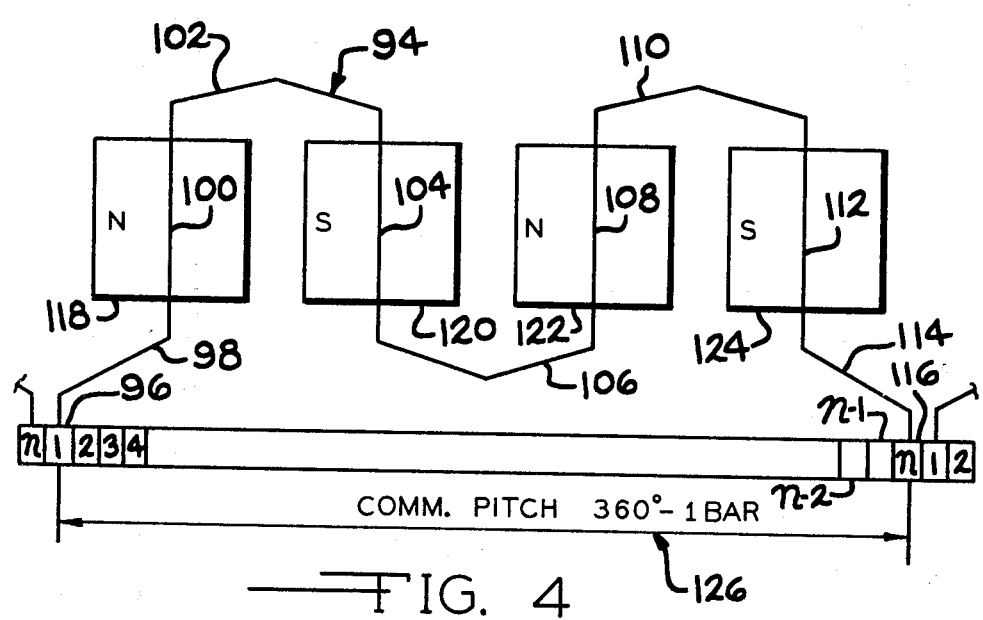
FIG. 4 is a fragmentary diagram illustrating the method of the present invention for doubling the number of winding turns on the armature of a lap wound four pole direct current machine.

FIG. 4 illustrates a method for winding an armature for a four pole lap wound direct current machine having two open turns per winding. As will be apparent, the same method may be used for lap windings having a greater number of turns. An exemplary winding 94 which avoids the difficulties of the prior art is illustrated in the block diagram of FIG. 4, and extends from a commutator segment 96 through a leg 98, a side 100, a knuckle 102, a side 104, a knuckle 106, a side 108, a knuckle 110, a side 112, a leg 114, and thence to a commutator segment 116. Side 100 is shown disposed adjacent a north pole 118, side 104 is shown disposed adjacent a south pole 120, side 108 is shown disposed adjacent a north pole 122, and side 112 is shown disposed adjacent a south pole 124. As will be apparent, additional turns may be added by continuing in similar fashion from side 112 to another knuckle, another side, another knuckle, etc., before returning to a segment 116, substantially adjacent segment 96. As shown in FIG. 4, for a four pole dynamoelectric machine with a simplex multiple open turn lap winding, segments 96 and 116 are separated by a mechanical commutator pitch 126 of 360° less one commutator segment, placing segments 96 and 116 substantially adjacent each other. As will be obvious, a winding 94 acording to the invention could also be connected as shown in FIGS. 2 and 3, except that legs between adjacent commutator segments and side 100 and 112 would of necessity be much longer, placing unnecessary electrical losses in an armature with windings according to the invention, an obviously less desirable arrangement of a winding according to the invention.

As the armature 10 rotates, the relative position of the sides 100, 104, 108 and 112 will change with respect to poles 118, 120, 122 and 124. It will be seen that winding 94 forms two open loops, with the sides 100 and 104 and interconnecting knuckle 102 forming one loop, and the side 108 and 112 and the interconnecting knuckle 110 forming the second open loop. Unlike the winding 46 shown in FIG. 2, the winding 94 illustrated in FIG. 4 is connected between commutator segments 96 and 116 mechanically adjacent each other by being positioned at a commutator pitch 125 of 360° less one bar from each other. Since there are four active winding sides, 100, 104, 108 and 112, as compared to the two active sides 38 and 42 for the single turn winding 36 as shown in FIG. 2, the voltage applied to winding 94, or generated by winding 94, may be doubled over the voltage of winding 36 shown in FIG. 2. It will be noted that the armature for the winding 94 can be constructed with the same number of commutator segments and the same number of slots as the armature for the winding 36 shown in FIG. 2. The primary difference is that there will be four conductors or winding sides in each slot for the armature illustrated in FIG. 4, whereas there are only two winding sides in each slot for the armature illustrated in FIG. 2. Or, two of the four conductors or winding sides can be placed in each of two adjacent slots, forming a distributed winding, in conventional fashion, for providing a slight increase in smoothness of commutation.

Figure 5:
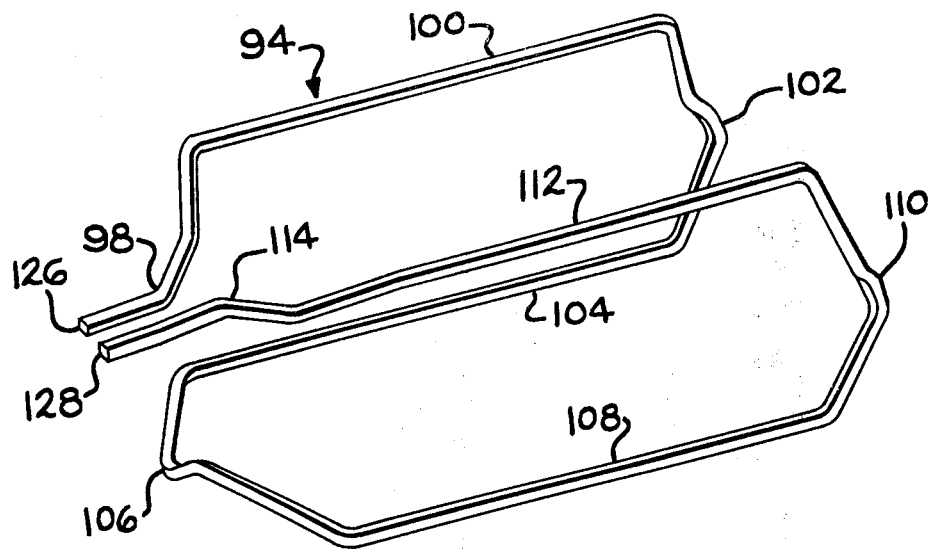
FIG. 5 is a perspective view of a free formed continuous elongated conductor for forming a two turn winding for the armature of a four pole lap wound direct current machine in accordance with one embodiment of the invention.

Turning now to FIG. 5, the final form for the winding 94 is illustrated in its free form, prior to positioning on the motor armature. The winding is free formed to have its final shape, with the sides 100, 104, 108 and 112 spaced parallel to each other and generally forming the outline of the long sides of a box having rectangular sides and square ends. The spacings between the sides 100, 104, 108 and 112 are substantially identical to their final spacings when they are positioned within their assigned slots on the armature core which, for a four pole motor, are spaced substantially 90° apart. One end of the winding side 100 is connected through leg 98 to an end 126, and one end of the side 112 is connected through a side 114 to an end 128. Ends 126 and 128 are connected, respectively, to risers for the commutator segments 96 and 116 on the armature 10. Where the winding 94 is formed from heavy gauge wire, or from wire having a rectangular cross section, preferably a square cross section, and of sufficient gauge to be self-supporting, the winding 94 is formed to substantially its exact final dimension as shown in FIG. 5. The winding 94 is then spread apart as far as is necessary to insert the winding 94 about the armature core, and to position the sides 100, 104, 108 and 112 within their assigned slots 24 on the armature core. Through this arrangement, it is possible to wind a multiple turn lap winding from rectangular or round cross section wire. As used herein, rectangular cross section wire includes a wire with a square cross section. Such a winding was not possible with prior art multiple turn windings, such as the winding. 66 shown in FIG. 3. The only prior art method known for positioning multiple turn windings of any type of rectangular cross section wire on an armature required forming the windings from separate straight segments inserted in individual slots, with separate pieces welded or soldered to their ends to form connections or knuckles.

Figure 6:
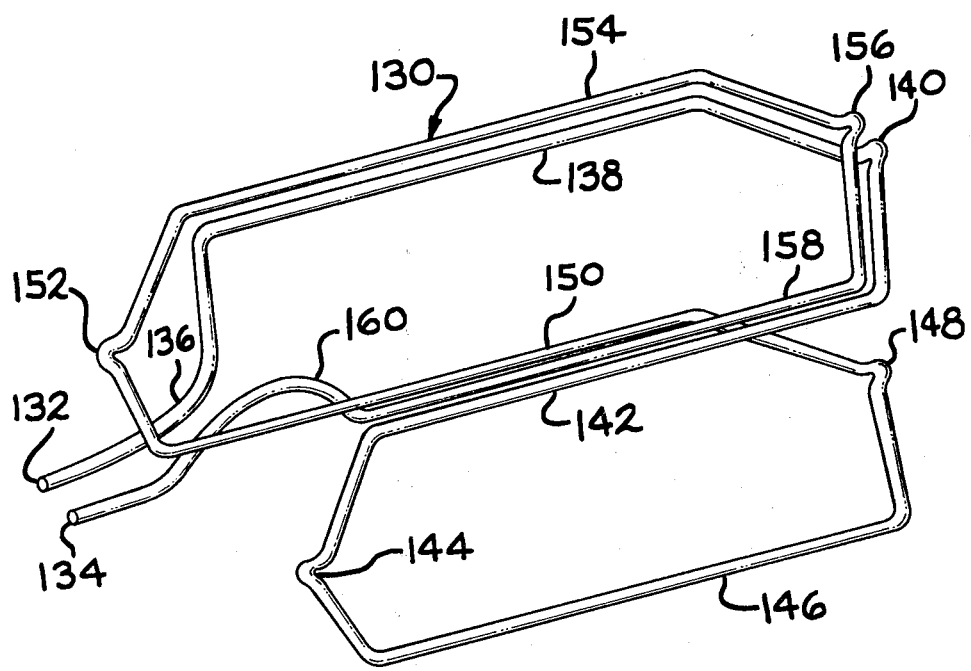
FIG. 6 is a perspective view of a free-formed winding for forming three open turns on the armature of a four pole lap wound direct current machine in accordance with another embodiment of the invention.

FIG. 6 illustrates a lap winding 130 for a four pole lap wound direct current machine, including three open turns instead of two open turns shown for the winding 94. The winding 130 is formed from a single continuous conductor which may have a round or rectangular cross section. The winding 130 has two ends 132 and 134 which are connected to risers on two commutator segments which are substantially adjacent to each other, such as by being spaced by 360° less one bar or segment, for a simplex winding. The end 132 is connected through a leg 136 to a side 138, through a knuckle 140 to a side 142, through a knuckle 144 to a side 146, through a knuckle 148 to a side 150, through a knuckle 152 to a side 154, through a knuckle 156 to a side 158, thence to a leg 160 connected to end 134. The sides 138 and 142 form a first open turn, the sides 146 and 150 form a second open turn, and the sides 154 and 158 form a third open turn, to define a three turn open lap winding configuration. When the winding 130 is placed on an armature, such as armature 10, the sides 138 and 154 are positioned abutting in the same winding core slot, and the sides 142 and 158 are positioned abutting in the same winding core slot. The two abutting sides 138 and 154, the two abutting sides 142 and 158, the side 146 and the side 150 are placed in four different slots which are spaced 90° apart about the axis of the armature, in the case of the illustrated four pole machine winding. Provided sufficient spacing is available in the armature core slots, the winding 130 may be further modified to provide four or more open turns by adding pairs of additional sides and interconnecting knuckle for each additional turn. In each case, the winding is free formed prior to positioning on the armature. The coils of the free-formed winding are deformed or separated to permit positioning the winding over the armature core with the sides of the winding located in their assigned slots. Of course, a distributed winding may also be formed as described above.

It will be noted that in the description of the invention, the two commutator segments to which the ends of a winding are connected have been described as being substantially adjacent each other. This is due to the fact that an armature may be wound simplex, as illustrated, or triplex, quadriplex, etc. Such windings effectively subdivide the total winding into the equivalent of two or more simplex windings in parallel to reduce the current density, and hence heating, of the winding. This results in a winding according to the invention being returned to a commutator segment that is spaced from the starting commutator segment by a number of segments equal to the degree of multiplicity less one.

It will be appreciated that various other modifications and changes may be made to the illustrated embodiments of the invention without departing from the spirit and scope of the invention.

What is claimed is:

1. A method for placing a winding on an armature of a four pole lap wound direct current machine, said armature including a plurality of commutator segments and a laminated core with a plurality of slots formed therein, comprising:

free forming a continuous elongated conductor having two ends into a plurality of open turns with each said turns having two sides, said formed conductor having substantially a final shape of said conductor on said core and having four said sides spaced to engage four different slots in said core spaced 90° apart; then spreading said sides apart and positioning said formed conductor about said armature core; then positioning said four sides in said four different slots in said core; and then attaching said conductor ends to two different commutator segments disposed substantially adjacent each other.

2. A method for placing a lap winding on an armature according to claim 1, wherein the step of free forming a continuously elongated conductor comprises the step of free forming a continuous elongated conductor having a rectangular cross section.

* * * * *